United States Patent [19]

Reesink

[11] Patent Number: 4,482,698

[45] Date of Patent: Nov. 13, 1984

[54] THERMOSETTING COATING COMPOSITION CONTAINING A BLOCKED ACID AS CATALYST

[75] Inventor: Johan B. Reesink, Didam, Netherlands

[73] Assignee: Akzo N.V., Arnhem, Netherlands

[21] Appl. No.: 521,098

[22] Filed: Aug. 8, 1983

[30] Foreign Application Priority Data

Aug. 9, 1982 [NL] Netherlands .......................... 8203131

[51] Int. Cl.$^3$ ............................................ C08G 12/32
[52] U.S. Cl. .................................... 528/242; 525/157; 525/443; 528/254
[58] Field of Search ................ 528/242, 254; 525/157, 525/443, 509; 524/902; 252/426, 439

[56] References Cited

U.S. PATENT DOCUMENTS 4,351,935 9/1982 Reesink ............................... 528/242

FOREIGN PATENT DOCUMENTS 1498073 1/1978 United Kingdom .
1519510 7/1978 United Kingdom .
1576314 10/1980 United Kingdom .
1576315 10/1980 United Kingdom .

*Primary Examiner*—Theodore E. Pertilla
*Attorney, Agent, or Firm*—Stevens, Davis, Miller & Mosher

[57] ABSTRACT

A thermosetting coating composition containing an acid-curable amino resin and from 0,1 to 10 percent by weight of a blocked sulphonic acid, calculated on the weight of amino resin. The blocked acid used is an O-sulphonyl hydroxamic ester of the formula [RSO$_2$ONHCOO]$_n$A, wherein n represents an integer from 1 to 5 and R and A are organic groups.

The new blocked acids are better soluble in the current solvents used in these coating compositions.

The compositions may be used advantageously for coating a substrate by electrostatic spraying.

10 Claims, No Drawings

THERMOSETTING COATING COMPOSITION CONTAINING A BLOCKED ACID AS CATALYST

The invention relates to a thermosetting coating composition containing an acid curable amino resin together with such an amount of a blocked acid as corresponds to 0,1 to 10 percent by weight, calculated on the amino resin of potentially available sulphonic acid, and to objects provided with a coat of paint obtained by curing such a coating composition. A thermosetting coating composition of the type indicated above is described, among other publications, in U.S. Pat. No. 4,351,935.

The blocked acids mentioned in it are prepared from a sulphonyl chloride and an oxime in the presence of an amine.

Although these compounds excel in low electric conductivity of the coating compositions in which these compounds are incorporated, they can still be improved upon in various respects.

Thus, the solubility of the known blocked acids in the current solvents used in these coating compositions is low. Besides, there is always need for compounds of which less need be incorporated and/or whose preparation results in a lower cost price.

To meet the above-mentioned drawbacks the invention provides a thermosetting coating composition containing a blocked acid which does not display the above-mentioned disadvantages at all or only to a greatly reduced extent.

The invention consists in that in a thermosetting coating composition of the known type mentioned in the opening paragraph the blocked acid is an O-sulphonyl hydroxamic ester of the formula: $[RSO_2ONHCOO]_nA$, wherein n represents an integer from 1 to 5 and A, when $n=1$, has the meaning of a substituted or unsubstituted alkyl, cycloalkyl, alkenyl, cycloalkenyl, aryl or heterocyclic group or when $n=2$ to 5 has the meaning of a substituted or unsubstituted alkylene, cycloalkylene, arylene or alkarylene group and R represents a substituted or unsubstituted alkyl, alkenyl, cycloalkyl, aryl or heterocyclic group.

It should be added that blocked acids of the type indicated above are known per se from British Patent Specification Nos. 1,498,073, 1,576,314 and 1,576,315.

The only application thereof mentioned therein is the cross-linking or chain-extension of hydrocarbon polymers which contain ethylenically unsaturated groups. In that case the acid forms the blocking agent and the hydroxamate is the compound that takes care of the cross-linking or the chain-extension of the polymer, which is in contrast to the situation with the coating composition of the present invention.

Coating compositions in which a blocked acid of the above formula is incorporated generally have a low electric conductivity.

In view of the effectiveness per unit weight preference is given to compounds in which A represents a group having not more than 20 carbon atoms and R a group having not more than 35 carbon atoms.

When $n=1$, preference is given partly in view of the preparation, to compounds in which A represents an alkyl group or aralkyl group having not more than 10 carbon atoms and R a lower alkyl group or a phenyl group substituted or not with an alkyl group having not more than 20 carbon atoms.

When n is an integer from 2 to 5, very favourable results are obtained with compounds wherein A has the meaning of a bis(alkyleneoxy)phenylene or polyoxyalkylene group. Preferred, however, are compounds wherein A has the meaning of $(CH_2)_m$, with $m=2$ to 10.

As examples of substituents in the groups R and A in the above structural formula may be mentioned fluorine, chlorine, bromine or iodine; nitro groups, cyano groups and alkoxy groups or alkanoyl groups. Optionally, also one or more ethylenically unsaturated groups may be present. This may be of particular importance if in addition to curing by the influence of an acid there is still some further curing by the influence of radical reactions.

Particularly favourable results are generally obtained when R has the meaning of an alkyl group having 1 to 4 carbon atoms or a phenyl, tolyl, nitro-, chloro-, bromo-, iodo-, fluoro- or alkoxy-phenyl group.

As examples of blocked acids which according to the invention may be incorporated in the present coating compositions there may be mentioned, when $n=1$:
O-methanesulphonyl-n-hexyloxyhydroxamate;
O-methanesulphonyl-n-octyloxyhydroxamate;
O-benzenesulphonyl allyloxyhydroxamate;
O-benzenesulphonyl benzyloxyhydroxamate;
O-p-toluenesulphonyl octadecanyloxyhydroxamate;
O-p-toluenesulphonyl oleyloxyhydroxamate;
O-p-nitrobenzenesulphonyl hexadecanyloxyhydroxamate;
O-α-naphthalenesulphonyl ethoxyhydroxamate.

Particularly favourable results have been obtained with, int. al.:
O-methanesulphonyl ethoxyhydroxamate;
O-p-toluenesulphonyl ethoxyhydroxamate;
O-methanesulphonyl benzyloxyhydroxamate, and
O-p-toluenesulphonyl benzyloxyhydroxamate.

As examples of blocked acids with $n=2$ may be mentioned:
1,2-ethyleneoxy bis(O-p-toluene sulphonyl hydroxamate),
1,3-propyleneoxy bis(O-p-toluene sulphonyl hydroxamate),
1,4-butyleneoxy bis(O-m-nitrobenzene sulphonyl hydroxamate),
1,4-butyleneoxy bis(O-methane sulphonyl hydroxamate) and
1,10-decamethyleneoxy bis(O-benzene sulphonyl hydroxamate).

Preparation of the blocked acids to be used in the coating compositions according to the present invention may be carried out by the process described in British Patent Specification Nos. 1,498,073 and 1,576,314.

In said process an oxyhydroxamic acid of the formula $A[OCONHOH]_n$, wherein A and n have the meaning stated above, is reacted with an equivalent amount of a sulphonyl chloride of the formula $RSO_2Cl$, wherein R has the meaning stated above, in the presence of an acid-binding agent which is added at a rate sufficient to neutralize the mineral acid formed whilst keeping the pH below 7.

The reaction between the oxyhydroxamic acid and the sulphonyl chloride is preferably carried out in an inert solvent at a temperature below 20° C., preferably between 0° and 5° C.

The oxyhydroxamic acids of the formula $A[OCONHOH]_n$ that are suitable for use in the preparation of the blocked acids to be incorporated into the coating compositions according to the present invention may be obtained by reacting a hydroxyl compound of the formula A—(OH)$_n$ with phosgene to form a chloroformate of the formula A[OCOCl]$_n$, which is subsequently reacted with hydroxylamine.

Another method of preparing the blocked acids according to the invention is carried out as follows:

To an aqueous solution of hydroxyl ammonium chloride to which sodium hydroxide has been added there is added a measured amount of the carbonate of the alcohol of the formula A(OH)$_n$. The resulting reaction product is treated with sodium hydroxide and taken up in dichloromethane, to which solution the calculated amount of sulphonyl chloride is added. The blocked acid left after the solvent has been evaporated off may optionally be purified by recrystallization.

As examples of polyols of the formula A(OH)$_n$ suitable for the preparation of blocked acids may be mentioned:

ethylene glycol, 1,2- and 1,3-propylene glycol, 1,4-, 2,3- and 1,3-butylene glycol, glycerol, trimethylol ethane, 1,1,1-trimethylol propane, pentaerythritol, diethylene oxide glycol, catechol and resorcinol.

As examples of hydroxyl compounds of the formula A—OH suitable for use in the preparation of the blocked acids may be mentioned: methanol, ethanol, n- and isopropanol, 2-ethyl hexanol, n-dodecanol, 2-phenyl ethanol, 2-furfuryl alcohol, sec-butyl carbinol cyclopentanol, crotyl alcohol, oleyl alcohol, benzyl alcohol, phenol and β-naphthol.

As examples of sulphonyl chlorides of the formula RSO$_2$Cl that are suitable for use in the preparation of the blocked acids may be mentioned:

methanesulphonyl chloride, benzenesulphonyl chloride, p-tolylsulphonyl chloride, m- and p-nitrobenzenesulphonyl chloride, dodecylbenzenesulphonyl chloride and α or β-naphthalenesulphonyl chloride.

The blocked acid to be used in the coating composition according to the invention is applied in an amount such as corresponds to 0,1 to 10 percent by weight, calculated on the amino resin of potentially available sulphonic acid.

The blocked acid may generally be effectively used in an amount ranging from 0,3 to 2% by weight, calculated on the solid constituents of the coating composition.

Under some circumstances it may happen that the temperature at which the coating is to cure remains below its desired value (usually 130°-140° C.), which results in a lower unblocking rate of the blocked acids. To overcome this problem the invention provides a coating composition in which also an amine is incorporated. The amount in which it is to be used ranges from 0,02 to 0,15% by weight, calculated on the coating composition.

An example of an amine which is suitable for the above-mentioned use is triethylamine. In view of the pot life of the coating composition, however, preference is given to the use of a blocked amine. Very favourable results were obtained when as blocked amine O-n-butyl carbamoyl benzohydroxamate was used.

The acid curable amino resins to be used according to the invention are generally known. They are normally obtained by condensation of an aldehyde such as formaldehyde with a urea, melamine or guanamine and the lower alkyl ethers thereof. A particularly attractive group of amino resins are the methylated melamine formaldehyde resins, including hexamethoxymethyl melamine and the mixed peralkoxy derivatives thereof. This hexamethoxymethyl melamine may be reacted with, for instance, an alkyd resin under conditions such that cross-linking will be minimal. The actual cross-linking will take place not until after the unblocking and release of acid upon heating the blocked acid-containing composition. In addition to the acid curable amino resin there may still be present some other co-condensable polymer. The latter should contain at least two hydroxyl groups, carboxyl groups, amine groups and/or amide groups. The co-condensable polymer used then may be an addition polymer or a condensation polymer.

Examples of addition polymers include the homopolymers and the copolymers of acrylic and methacrylic acid and other unsaturated monomers or mixtures of monomers; the homopolymers and copolymers of ethylenically unsaturated monomers such as styrene, substituted styrene; vinyl esters such as vinyl acetate, vinyl proprionate, and the like; α-olefins, such as ethylene, propylene, 1-butene, 1-octene; vinyl chloride, vinylidene chloride, conugated dienes such as 1,3-butadienes; fluorine-containing olefines such as vinyl fluoride and hexafluoropropylene; vinyl ether and allyl ether; and the monoesters and diesters of α,β-ethylenically unsaturated dicarboxylic acids such as monoalkyl maleates and dialkyl maleates, monoalkyl fumarates and dialkyl fumarates, monoalkyl itaconates and dialkyl itaconates. The functional groups that are needed to bring about a condensation reaction with the acid curable amino resin may be introduced during the preparation of the polymer or afterwards. As examples of suitable monomers may be mentioned: hydroxyethyl acrylate, hydroxypropyl acrylate, hydroxyethyl methacrylate, hydroxypropyl methacrylate, acrylic acid, methacrylic acid, itaconic acid, maleic acid, N-t-butylaminoethyl methacrylate, acrylamide and/or methacrylamide. As examples of a post-condensation reaction may be mentioned the hydroxymethylation of an amide-containing polymer.

Examples of condensation polymers include the alkyd resins derived from a polyhydric alcohol and a polybasic acid. Among them are polyesters that may be modified with fatty acids and/or polyethers. The diols suitable for use in the preparation of the polyesters may be aliphatic or aromatic. Examples of suitable diols include ethylene glycol, 1-,2-propylene glycol, 1,3-propylene glycol, 1,2-butanediol, 1,3-butanediol, 1,4-butanediol, neopentyl glycol, 2,2,4-trimethylpentane-1,3-diol, decamethylene glycol, monoethyl ether of glycerol and/or the α,β allyl ether of glycerol.

The dicarboxylic acids suitable for use in the preparation of the polyesters may be aliphatic, cycloaliphatic or aromatic. Suitable dicarboxylic acids are malonic acid, succinic acid, glutaric acid, adipic acid, pimelic acid, suberic acid, azelaic acid, maleic acid, fumaric acid, tetrahydrophthalic acid, dilinolic acid, diphenic acid, tetrachlorophthalic acid, isophthalic acid, terephthalic acid, o-phthalic acid, 1,2-cyclohexane dicarboxylic acid, the naphthalene dicarboxylic acids and/or trimethyl adipic acid. Also natural polymers based on cellulose and derivatives thereof are suitable for use in the coating compositions.

The invention will be further described in the following examples. They are, of course, not to be construed as limiting in any manner the scope thereof.

The test methods mentioned in the examples below were all carried out in conformity with the ASTM and the DIN standards indicated. The Persoz hardness was determined in accordance with French NF-standard T-30-016. The following ester diol was employed in the examples below and in all cases hexamethoxymethyl melamine was used as cross-linking agent.

Use was made of a diester diol consisting of a mixture of equal parts by weight of (a) di(monodecanoic ester of trimethylol propane)isophthalate and (b) a mixture of 1 part of di(neopentyl glycol)isophthalate and 2 parts of di(neopentyl glycol)phthalate.

EXAMPLE I

Preparation of O-p-toluenesulphonyl ethoxyhydroxamate

To a solution of 477 g of sodium carbonate in 1380 ml of water there were added 240 g of hydroxylamine hydrochloride. Subsequently, 324 g of ethylchloroformate were added over a period of 1½ hours while maintaining a maximum temperature of 20° to 25° C. Next, the mixture was stirred for 1 hour at room temperature, after which the reaction mixture was acidified with concentrated hydrochloric acid.

The reaction mixture was then extracted with ether and the ether solution was dried with magnesium sulphate. After the ether had been distilled off, there remained 245 g of a pale yellow oil (ethoxyhydroxamic acid). This oil was dissolved in 0,5 l of tetrahydrofuran and added to a solution in 1 l of tetrahydrofuran of 442,7 g of p-toluene sulphonyl chloride cooled to 0° C.

Subsequently, over a period of 1½ hours at a temperature of 0° to 5° C. 235 g of triethylamine were added with stirring, after which stirring was continued for 1 hour at a temperature in the range of 0° to 5° C. The precipitated triethylamine hydrochloride was filtered off and washed with tetrahydrofuran. The filtrate was subsequently concentrated in a rotary vacuum evaporator. The residue was then dissolved in 2 l of dichloromethane, washed with cold dilute hydrochloric acid and subsequently with cold water until a neutral solution was obtained.

After the dichloromethane solution had been dried, it was concentrated in rotary vacuum evaporator to give 610 g of residue. The product was recrystallized to give 358,5 of O-p-toluene sulphonyl ethoxyhydroxamate having a melting point in the range of 63,3° to 65,8° C.

EXAMPLE II

The same procedure was used as in Example I for preparing:
O-methanesulphonyl ethoxyhydroxamate (liquid);
O-p-toluenesulphonyl benzyloxyhydroxamate (melting point 123°-124° C.);
O-methanesulphonyl benzyloxyhydroxamate (melting point 82,1°-83,7° C.).

EXAMPLE III

Pigment dispersions were prepared consisting of 58 parts of titanium white, 7 parts of an alkyd resin, 31 parts of the above-mentioned diester diol and 3 parts of butyl acetate. Of each of these dispersions 60 parts were mixed with 24 parts of the diester diol and 12 parts of hexamethoxymethyl melamine.

In each of the compositions thus obtained there were incorporated 3 parts of a catalyst solution in a mixture of butyl acetate and xylene (1:1), the viscosity obtained corresponding to an efflux time of 60 seconds (determined in accordance with the German industrial standard DIN 53211 4 mm).

Part of the coating compositions thus prepared was applied to a phosphated iron plate and cured for 25 minutes at 140° C.

The properties were measured on cured coating compositions containing the blocked or non-blocked acids indicated below. The amount of catalyst used for each composition is in percent by weight of p-toluene sulphonic acid (PTS), calculated on the binder content of the coating composition. Composition No. 1 contained 0,5% by weight of p-toluene sulphonic acid (PTS) together with an equivalent amount of diethanolamine. Composition No. 2 contained a commercially available acid blocked with an epoxy compound according to German Patent Specification 27 31 528, under the chemical name 2,3-epoxypropyl-1,1-dimethylheptane carboxylate in an amount of 2,5% by weight (calculated as PTS). Composition No. 3 contained 2,2% by weight of benzilmonoxime tosylate corresponding to 1% by weight of PTS.

Composition No. 4 contained 1,5% by weight of O-p-toluenesulphonyl ethoxyhydroxamate of the invention, corresponding to 1% by weight of PTS. Composition No. 5 contained 0,75% by weight of O-p-toluenesulphonylethoxyhydroxamate corresponding to 0,5% by weight of PTS and Composition No. 6 was indentical with Composition No. 5, except that it also contained some amount of diethanolamine equivalent to the amount of PTS. The measuring results for the various properties of the cured coating compositions are given in the table below.

The hardness (König Pendelhärte [PH]) was determined in accordance with DIN 53157, the Erichsen indentation test (mm) in accordance with DIN 53156 and the 20° gloss in accordance with ASTM D 523.

TABLE I

| Composition No. | Konig hardness (PH) | Erichsen indentation test | gloss |
|---|---|---|---|
| 1 | 79 | 7,1 | 60 |
| 2 | 27 | 9,5 | 74 |
| 3 | 91 | 4,7 | 82 |
| 4 | 97 | 4,7 | 86 |
| 5 | 85 | 7,0 | 84 |
| 6 | 80 | 7,7 | 78 |

The above table clearly shows that the physical properties of the cured coatings containing a catalyst according to the invention perfectly compare with those of the coatings containing a known catalyst. The low values for the gloss of compositions 1 and 2 are entirely due to some fouling of the test desks.

EXAMPLE IV

Of the compositions mentioned in Example III the increase in viscosity was determined after 8 weeks' storage at room temperature. The table below gives the results of the viscosity measurements determined in accordance with DIN 53211 4 mm. The initial viscosity for all compositions was 60 sec.

TABLE II

| Composition No. | viscosity in sec. |
|---|---|
| 1 | 74 |
| 2 | 59 |
| 3 | 68 |
| 4 | 67 |

TABLE II-continued

| Composition No. | viscosity in sec. |
|---|---|
| 5 | 59 |
| 6 | 61 |

From the above table it follows that the increase in viscosity of Composition No. 1 was high compared with that of the Compositions 3 and 4 (of the present invention). The Compositions 2 and 5 (of the present invention) do not even show any increase in viscosity at all.

EXAMPLE V

Pigment dispersions were prepared by mixing 24 parts of titanium white with 3 parts of an acrylate resin, 7,5 parts of hexamethoxymethyl melamine, 1 part of xylene and 1 part of ethylglycol acetate. To each mixture there was added diester diol in a ratio of 3 parts of diester diol to 1 part of hexamethoxymethyl melamine. The pigment/resin ratio was 0,67. In each of the resulting coating compositions there was incorporated one of the catalysts mentioned below dissolved in ethylglycol acetate. Each composition was diluted with said last-mentioned solvent to a viscosity corresponding to an efflux time of 60 sec. in accordance with DIN 53211 4 mm.

The following catalysts according to the invention were incorporated in the above composition:
O-p-toluenesulphonyl benzoxyhydroxamate (PTBH)
O-p-toluenesulphonyl ethoxyhydroxamate (PTEH).

After the above compositions had been applied to a phosphated iron plate, they were cured for 25 minutes at 130° C. In the table below the results are given of hardness measurements on the coats obtained. The hardness was measured in accordance with NF T-30-016 (Persoz). The thickness of the coats was determined in conformity with ASTM D1186-53. The results are given in the table below.

TABLE III

| Catalyst | Catalyst conc. expressed in wt. % PTS | Coating thickness μm | Persoz hardness (sec.) |
|---|---|---|---|
| PTBH | 0,5 | 40 | 227 |
| PTBH/DEA* | 0,5 | 45 | 314 |
| PTEH | 0,5 | 35 | 258 |
| PTEH | 1,0 | 40 | 270 |

*with equivalent amount of diethanolamine (DEA)

EXAMPLE VI

In the table below the influence is shown of various types of catalysts on the König Pendel hardness (DIN 53157) after curing at 140°, 130° and 120° C. of a coating composition identical with that given in Example III. The amount of catalyst used for each composition corresponded to 0,5% by weight of PTS. The blocked or non-blocked acids used were:
p-toluene sulphonic acid (PTS) 0,5% by weight;
O-p-toluenesulphonyl ethoxyhydroxamate (PTEH) 0,75% by weight;
benzilmonoxime tosylate (BOT) 1,12% by weight.
Also the results are given of a few experiments with PTEH to which a small amount of an amine, viz. aminomethyl propanol (AMP) had been added.

TABLE IV

| Catalyst in wt. % | Konig PH in sec | | |
|---|---|---|---|
| | 140° C. | 130° C. | 120° C. |
| 0,5 PTS | 186 | 153 | 66 |
| 0,75 PTEH | 188 | 77 | sticky |
| 1,12 BOT | 195 | 160 | 69 |
| 0,5 PTEH + 0,1 AMP | 168 | 183 | 168 |
| 0,5 PTEH + 0,05 AMP | 190 | 176 | 70 |
| 0,5 PTEH + 0,025 AMP | 187 | 171 | 7 |

The above table clearly shows the favourable influence of a small amount of amine of the Pendel hardness after curing at 130° C. That the addition of such a small amount is still quite acceptable with respect to the electric resistance of the above-mentioned composition is shown in the table below.

TABLE V

| Catalyst | Electric resistance, kΩ |
|---|---|
| none | 720 |
| 0,7 PTEH | 680 |
| 0,7 PTEH + 0,1 AMP | 370 |
| 0,7 PTEH + 0,05 AMP | 360 |
| 0,7 PTEH + 0,025 AMP | 500 |

I claim:

1. A thermosetting coating composition containing an acid curable amino resin and an amount of a blocked acid corresponding to 0,1 to 10 percent by weight, calculated on the amino resin of potentially available sulphonic acid, characterized in that the blocked acid is an O-sulphonyl hydroxamic ester of the formula: $[RSO_2ONHCOO]_nA$, wherein n represents an integer from 1 to 5 and A, when n=1, has the meaning of a substituted or unsubstituted alkyl, cycloalkyl, alkenyl, cycloalkenyl, aryl or heterocyclic group or when n=2 to 5 has the meaning of substituted or unsubstituted alkylene, cycloalkylene, arylene or alkarylene group and R represents a substituted or unsubstituted alkyl, alkenyl, cycloalkyl, aryl or heterocyclic group.

2. The coating composition of claim 1, wherein A represents a group having not more than 20 carbon atoms and R a group having not more than 35 carbon atoms.

3. The coating composition of claim 1 or 2, wherein n=1, and A represents an alkyl group or aralkyl group having not more than 10 carbon atoms and R a lower alkyl group or a phenyl group substituted or not with an alkyl group having not more than 20 carbon atoms.

4. The coating composition of claim 1 or 2, wherein n=2, and A is $(CH_2)_m$ with m=2 to 10.

5. The coating composition of claim 3, wherein the blocked acid is O-methanesulphonyl ethoxyhydroxamate or O-p-toluenesulphonyl ethoxyhydroxamate.

6. The coating composition of claim 3, wherein the blocked acid is O-methanesulphonyl benzyloxyhydroxamate or O-p-toluenesulphonyl benzyloxyhydroxamate.

7. The coating composition of claim 1, wherein the blocked acid is ethylene dioxy bis(O-methane sulphonyl hydroxamate) or ethylene dioxy bis(O-p-toluene sulphonyl hydroxamate).

8. The coating composition of claim 1, 2, 3, 4, 5, 6 or 7, which also contains an amine.

9. The coating composition of claim 8, wherein the weight ratio between the blocked acid and the amine is between 0,02 and 0,15% by weight, calculated on the coating composition.

10. As a new article of manufacture, an article coated with the coating composition of claim 1.

* * * * *